(12) United States Patent
Li et al.

(10) Patent No.: US 8,203,105 B2
(45) Date of Patent: *Jun. 19, 2012

(54) NANO THICKNESS HEATING MATERIAL COATED FOOD WARMER DEVICES FOR HOSPITAL AND ELSEWHERE DAILY USAGE

(75) Inventors: Geng Li, Hong Kong (CN); Joey Cho Yee Chow, Hong Kong (CN); Chih Lin I, Hong Kong (CN); Edward S. Yang, Hong Kong (CN)

(73) Assignee: Advanced Materials Enterprises Company Limited, Hong Kong (HK)

( * ) Notice: Subject to any disclaimer, the term of this patent is extended or adjusted under 35 U.S.C. 154(b) by 800 days.

This patent is subject to a terminal disclaimer.

(21) Appl. No.: 12/176,055

(22) Filed: Jul. 18, 2008

(65) Prior Publication Data
US 2010/0012643 A1     Jan. 21, 2010

(51) Int. Cl.
H05B 1/02 (2006.01)
H05B 3/22 (2006.01)
H05B 3/26 (2006.01)

(52) U.S. Cl. ........ 219/553; 219/494; 219/541; 219/542; 219/543

(58) Field of Classification Search .................. None
See application file for complete search history.

(56) References Cited

U.S. PATENT DOCUMENTS

| | | | | |
|---|---|---|---|---|
| 3,573,430 A | * | 4/1971 | Eisler | 219/385 |
| 3,590,727 A | * | 7/1971 | Shevlin | 99/339 |
| 3,608,627 A | * | 9/1971 | Shevlin | 165/206 |
| 3,784,787 A | * | 1/1974 | Shevlin | 219/386 |
| 3,830,148 A | * | 8/1974 | Shevlin | 99/359 |
| 3,890,484 A | * | 6/1975 | Kamins et al. | 219/432 |
| 4,068,115 A | * | 1/1978 | Mack et al. | 219/386 |
| 4,167,983 A | * | 9/1979 | Seider et al. | 180/19.1 |
| 4,904,848 A | * | 2/1990 | Colevas | 219/387 |
| 4,952,783 A | * | 8/1990 | Aufderheide et al. | 219/528 |
| 5,183,994 A | * | 2/1993 | Bowles et al. | 219/387 |
| 6,028,293 A | * | 2/2000 | Nagle et al. | 219/432 |
| 6,072,161 A | * | 6/2000 | Stein | 219/432 |
| 6,144,016 A | * | 11/2000 | Garvin | 219/387 |
| 6,242,722 B1 | * | 6/2001 | Provancha et al. | 219/543 |
| 6,539,846 B2 | * | 4/2003 | Citterio et al. | 99/468 |
| 7,208,700 B2 | * | 4/2007 | Peterson et al. | 219/386 |
| 7,423,239 B2 | * | 9/2008 | Mann | 219/203 |
| 7,886,554 B2 | * | 2/2011 | Simoner | 62/248 |
| 2005/0006373 A1 | * | 1/2005 | Owens et al. | 219/387 |
| 2006/0138127 A1 | * | 6/2006 | Kawashima et al. | 219/730 |

(Continued)

FOREIGN PATENT DOCUMENTS

JP        07241246 A    *   9/1995

OTHER PUBLICATIONS

JP 07-241246 A, Machine translations of Description and Drawing key.*

(Continued)

Primary Examiner — Joseph M Pelham

(57) ABSTRACT

Embodiments involve a food warmer that uses a nano thickness heating material as the heating element. The heating element has a fast response and is energy efficient. The temperature of the food warmer can be precisely controlled. The food warmer may be used to heat cold food to a desired temperature, maintain a temperature of already heated food, and/or cook uncooked food.

31 Claims, 6 Drawing Sheets

U.S. PATENT DOCUMENTS

| | | | |
|---|---|---|---|
| 2007/0278207 A1* | 12/2007 | Van Hoy et al. | 219/387 |
| 2007/0292311 A1* | 12/2007 | Matsumoto | 422/68.1 |
| 2008/0057196 A1* | 3/2008 | Ishikawa et al. | 427/248.1 |
| 2008/0190912 A1 | 8/2008 | Yeung et al. | |
| 2008/0264930 A1* | 10/2008 | Mennechez et al. | 219/552 |
| 2009/0194525 A1* | 8/2009 | Lee et al. | 219/553 |
| 2009/0235915 A1* | 9/2009 | Doumanidis et al. | 126/263.01 |
| 2010/0000985 A1* | 1/2010 | Feng et al. | 219/546 |

OTHER PUBLICATIONS

U.S. Appl. No. 60/900,994, Torpy.

U.S. Appl. No. 60/990,619, Yeung.

* cited by examiner

|← 100 nm →|

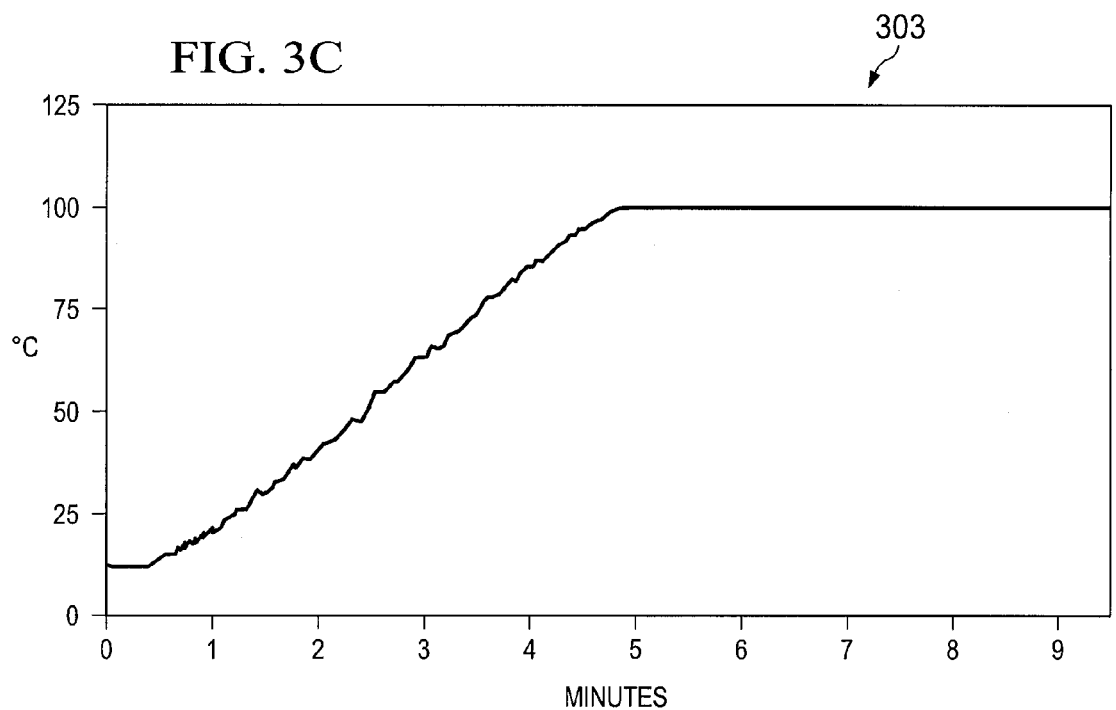
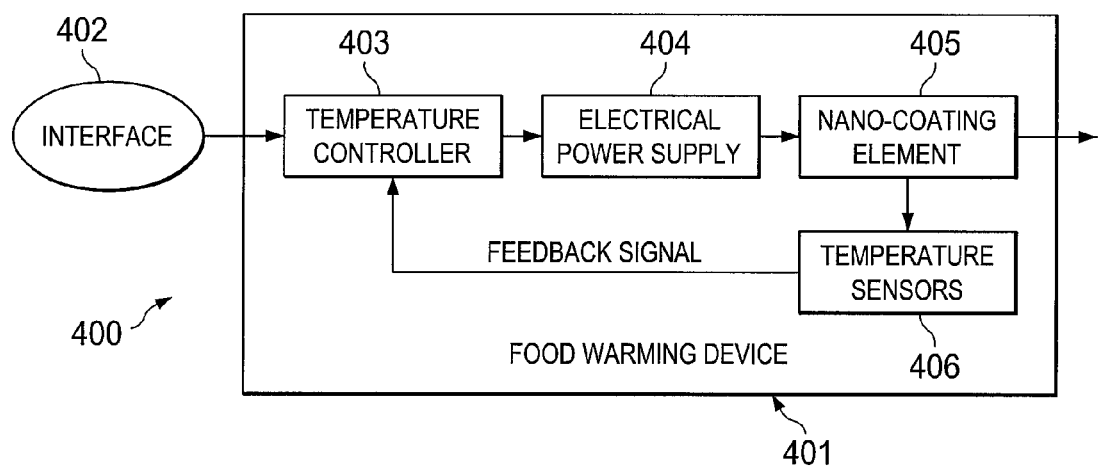

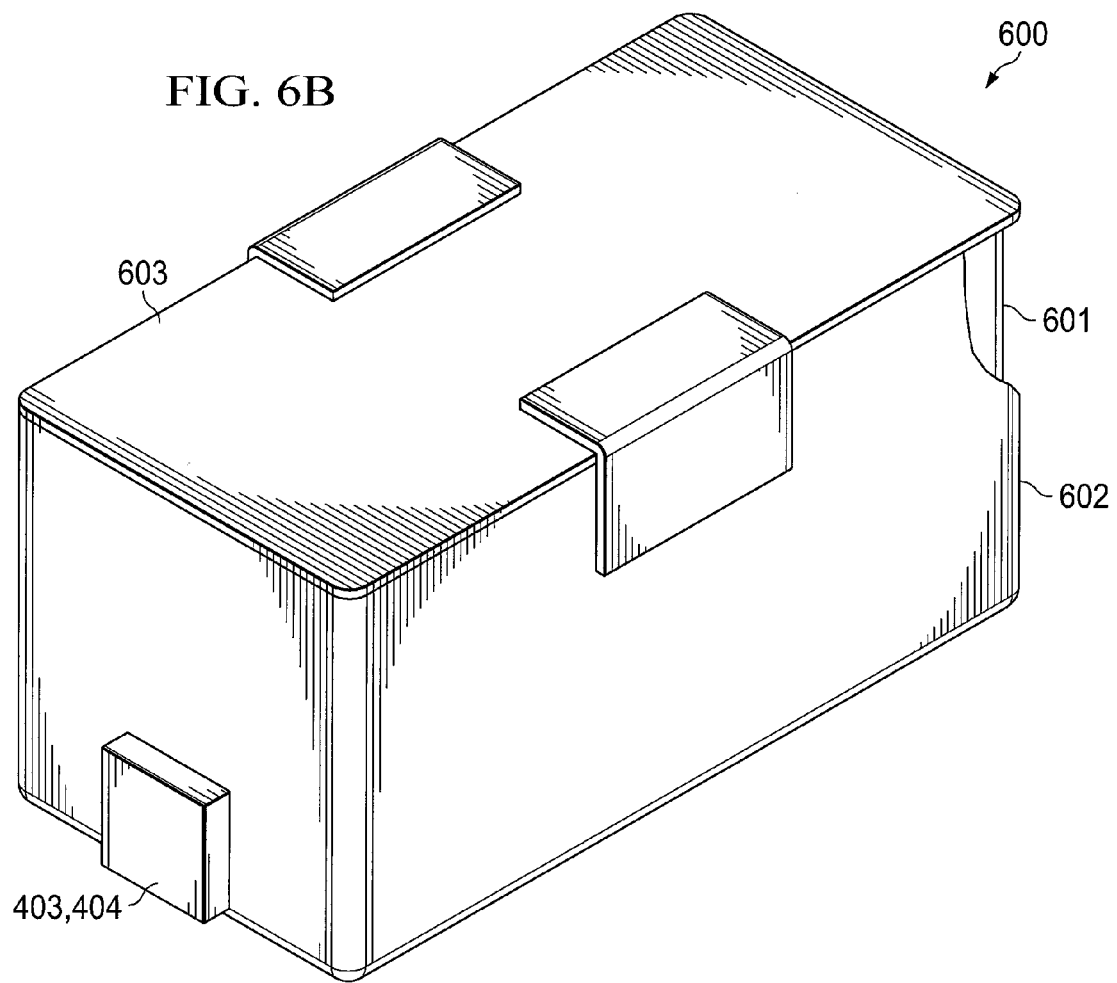

NANO THICKNESS HEATING MATERIAL COATED FOOD WARMER DEVICES FOR HOSPITAL AND ELSEWHERE DAILY USAGE

TECHNICAL FIELD

This application relates in general to food preparation, and in specific to systems and methods using a food warmer with a nano thickness heating element.

BACKGROUND OF THE INVENTION

Hot food will cool quickly to room temperature, unless the temperature of the food is maintained by food warmer. One type of food warmer is a hot plate based food warmer. These food warmers typically use a metal heating element systems and require an electrical outlet for power. The hot plate type food warmers may comprise a base, upon which a plate, pan, or other cooking container may be placed. The hot plate type food warmer may comprise a food warming dish that is used to maintain the temperature of the food, and is used to serve the food.

Another type of food warmer is a water based food warmer. With this type, a container that holds food is placed into a larger container that holds water. The water is then heated, either electrically or via combustion (e.g. sterno), which in turn, warms the food. Thus, this type requires either an electrical outlet power or a flammable source for heat.

BRIEF SUMMARY OF THE INVENTION

The present invention is directed to systems and methods which use a food warmer to maintain the temperature of hot food and/or rapidly heat cold food to a desired temperature.

Embodiments of the invention use one or more layers of a conformal nano thickness heating material that is coated onto a glass surface as the heating element for the food warmer. The heating element is energy efficient and quick to heat to the desired temperature. The food warmer uses a temperature control system with rapid and accurate response to maintain the food at a desired temperature and/or heat the food to a desired temperature. The food warmer uses a rechargeable power supply, e.g. a battery to provide power for the heating element. The food warmer may include insulation to retain the heat provided by the heating element. The insulation may be located on the bottom and/or sides. If the food warmer is box shaped, then the insulation may be located on the top as well.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 3A-3C depict graphs of performance tests for the heating element of FIG. 1;

FIG. 4 depicts an exemplary schematic diagram of a food warmer system, according to embodiments of the invention;

FIGS. 6A and 6B depict an exploded view and an assembled view, respectively, of a box food warmer, according to embodiments of the invention.

DETAILED DESCRIPTION OF THE INVENTION

Figure 1A:
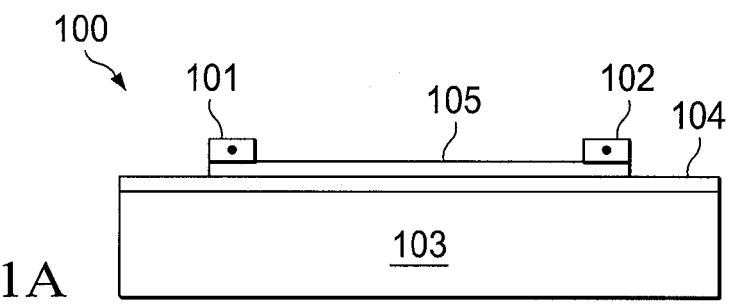
FIGS. 1A and 1B depict a side view and a plane view, respectively, of a schematic diagram of a heating element, according to embodiments of the invention.

As discussed above, prior art food warmers suffer from a number of problems. The food warmers typically require an electrical outlet to power their heating elements. Thus, these food warmers are not portable. The heating elements that the prior art food warmers typically use is a metal element that is does not provide uniform heating, and cannot be precisely controlled. Another problem is that the heating element is power inefficient. Thus, they are not amenable to use battery power.

Embodiments of the invention are useful in institutional locations such as schools, hospitals, nursing homes, retirement homes, commercial kitchens, hotels, banquet halls, cafeterias, and restaurants, where it is necessary to maintain the temperature of hot food after its preparation and during serving. By maintaining the temperature of the food, the palatability of the food is also maintained, as well as prevention or reduction of bacteriological contamination. Note that embodiments of the invention may be useful in residential kitchens to achieve the same advantages.

Embodiments of the invention are also useful for portable food storage devices, e.g. lunch boxes. Thus, food may be stored at a cold temperature or frozen, until needed. At which time, the heating element of the food warmer is turned on, which rapidly heats the food to a desired temperature. Note that embodiments may be used to cook raw food, rather than heating already cooked food.

Note that the food warmer may be used in vending machines. The food may be stored in the food warmer at a cold temperature or frozen in the vending machine, until purchased. The power supply of the food warmer may be kept charged until purchased, may be charged up after purchase. After purchasing the food, the consumer then activates the food warmer, which warms the food to a desired or preset temperature. Note that with this arrangement, the power supply may comprise a single use power storage device such as a capacitor. The power supply need only store the charge for a short period of time, e.g. a few hours. This would reduce the cost of the food warmer, and make the food warmer disposable or recyclable.

Further note that the food warmer may be used for camping. Instead of a rechargeable power supply, a replaceable power supply is used. Thus, after each use, a fresh power supply is inserted, and the food warmer is ready for use. Therefore, a camper would not need to use camp fuel, which may be inconvenient to ignite in cold temperatures, dangerous as a flammable substance, and/or difficult to handle and store as a liquid.

Embodiments of the invention allow the heating element to have different shapes and/or curvature since the heating material is conformal. The heating element comprises a glass substrate upon which the heating element is formed.

Embodiments of the invention provide a food warmer that is portable, capable of being carried by hand, light, durable, easy to clean, and safe for use by an individual. The food warmer has low manufacturing costs and low maintenance costs. The food warmer can be sized to hold food for an individual, or for a plurality of individuals. The food warmer is capable of being adorned with ornamentation, and thus can be made as elegant as desired. The side of the food warmer that holds the food may comprise different materials, e.g. metals, plastics, ceramics, porcelain, paints, etc.

Note that the food warmer may have different areas or sections that heat at different temperatures and/or different times. For example, a food warmer may have an appetizer section, a main course section, and a dessert section. Each section may heat at different times, so that the food as at the desired temperature when consumed. Thus, a typical consumer eats the appetizer first, the main course second, and the dessert last. Thus, the food warmer may heat the appetizer first, the main course second, and the dessert last. Furthermore, the sections may heat at different temperatures. For example, the appetizer may be heated to 85 degrees C., the main course may be heated to 50 degrees C., and the dessert may be heated to 35 degrees C. Each section would require separate heating elements and electrodes, but can be controlled by a common controller.

Further note that the food warmer may comprise a plate, a cup, a mug, a bowl, a tray, a bottle, a food container or storage box, a vacuum bottle, a food box located in a foam insulated container, a pot, a pan, a dutch oven, other cooking device, and/or other serving device.

Embodiment of the invention may be used in heating devices other than food warmers. For example the heating element may be used in cooktops, hotplates, heaters and defrosters, warming devices, autoclaves, incubators, portable heaters, electric baseboard heaters for a home, body warmers, bed warmers, chair warmers for a home, hospital, or nursing home, or room warmers, saunas and/or any other heaters.

Embodiments involve a food warmer that uses a nano thickness material as the heating element. The heating element has a fast response, and is energy efficient. The temperature of the food warmer can be precisely controlled. The food warmer may be used to heat cold food to a desired temperature, maintain a temperature of already heated food, and/or cook uncooked food.

One exemplary material that may be used as a heating element is a multilayered nano thickness coating material which includes of tin, tungsten, titanium and vanadium with organometallic precursors like Monobutyl Tin Tri-chloride doped with equal quantities of donor and acceptor elements preferably antimony and zinc at about 3 mol % deposited over the insulating coating layers and the ceramic glass from Advanced Materials Enterprises (AME) referred to as Nano-Heat™. For further information, please see pending U.S. application Ser. No. 12/026,724 filed Feb. 6, 2008, which claims priority to U.S. Provisional Application 60/900,994 filed on Feb. 13, 2007, and U.S. Provisional Application 60/990,619 filed on Nov. 28, 2007, all of which are hereby incorporated herein by reference. Note that other materials may be used, so long as the material is energy efficient.

The material used to form the heating element is deposited onto a substrate by using a low-cost spray method in an open-air environment. The material maintains a stable structure with a low risk of crack formation, and has high conductivity. The material maintains its heating performance at high temperatures for prolonged time periods. The material may be deposited in multiple layers which are coated on the ceramic glass. Note that other materials may be used as the substrate, for example a high temperature plastic.

In a conventional heating element that uses a metal coil, energy outputs come from a high electrical resistance of the metal coils with a low heating efficiency and high power loss. By adjusting the composition and thickness of the coating layers, the electrical resistance of the coating system can be controlled and conductivity can be increased to generate high efficiency heating with minimal energy loss, according to embodiments of the invention. Thus, nano thickness heating elements are reliable high temperature heating elements capable of performing efficient, reliable and consistent heating functions up to about 600° C. Note for temperatures greater than 600° C., additional layers are needed.

The nano thickness heating element comprises one or more layers of insulating material, one or more layers of conducting material, and at least two electrodes. The layers are deposited onto a substrate, e.g. a ceramic glass, glass substrate, or plastic. The insulating layers are multiple layers of nano thickness insulating coatings wetted with a surfactant on a ceramic glass surface to electrically isolate the conductive coating to the ceramic glass and prevent detrimental elements migrating from the substrate into the conductive coating. The conducting layers are multiple layers of nano-thickness of conductive coatings of a base chemistry, doped elements and controlled process conditions, with source metal from the group consisting of tin, tungsten, titanium and vanadium with organometallic precursors like Monobutyl Tin Tri-chloride doped with equal quantities of donor and acceptor elements preferably antimony and zinc at about 3 mol %. The conducting layers are deposited over the insulating layers. The layers are preferably deposited using spray pyrolysis with controlled temperature and spray movement. The electrodes are ceramic frit parallel electrodes across the coatings to ensure optimum matching between the electrodes and the coatings and the substrate, to reduce electric resistance and improve conductivity across the heating element.

For optimal temperature control and energy savings, it is preferred that a temperature controller is used. For example, an intelligent power monitor and control system may be used that includes an ADC (analog-to-digital converter) and PWM (pulse-width modulation) drives to achieve accurate temperature control, which smoothes the power delivery to the heating elements and optimizes their heating performance and energy saving efficiency.

Note that using embodiments of the invention, fast and efficient heating functions up to about 600° C. with low power loss are achieved. Thus, the heating elements may be used in applications other than the food warmer. For example, the heating elements may be locating in devices including but not limited to cooktops, hotplates, heaters and defrosting and warming devices. Note that embodiments reduce electricity consumption by almost 30% due to its high energy efficiency, and thus provides significant benefits in minimizing pollution and global warming, and also helps consumers to reduce their electricity bills.

Further note that when used in cooktop and hotplate applications, embodiments of the invention are comparable with and outperforming the current induction heating technology. The embodiments have no magnetic radiation and interference as compared with the magnetic induction used in induction heating, low material costs as compared with the expensive copper coil used in induction heating, no restrictions on cooking utensils as compared with the requirement that only high grade stainless steel utensils can be used with induction heating.

Figure 1B:
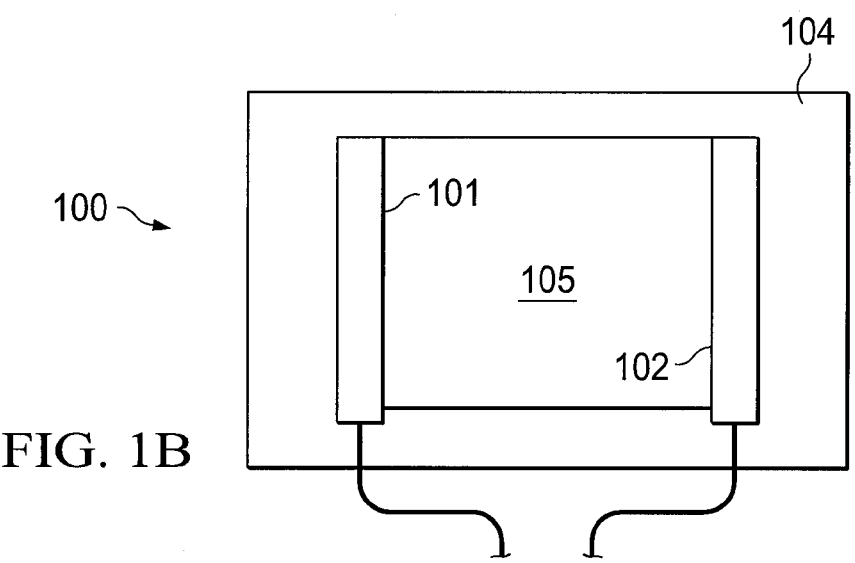

FIGS. 1A and 1B depict a side view and a plane view, respectively, of a schematic diagram of a heating element 100, according to embodiments of the invention. Note that this is by way of example only, as other heating elements and their components can have different shapes and different sizes. Also the location of the electrode may be different. For example, the heating element may be circular in shape, with one electrode located around the outer periphery and the other electrode located at the center, forming a bull's eye pattern.

The heating element is formed on a substrate 103, for example a glass, ceramic glass, or plastic. The heating element 100 includes electrodes 101, 102 that connect with a power supply (not shown). The electrodes may comprise any material that conducts electricity. For example, the electrodes may comprise a ceramic frit. The electrodes are arranged in a parallel manner to provide consistent electrical distribution. The heating element includes optional insulating layer 104. Note that this layer may comprise a plurality of layers. This layer may comprise the materials discussed above. The heating element further includes conductive layer 105. Note that this layer may comprise a plurality of layers. This layer may comprise the materials discussed above. Note that each layer of the heating element may be 60-70 nanometers (nm) thick. The insulating layer and the conducting layer may comprise 8-12 layers for a total thickness of 720-840 nm for the heating element.

Figure 2:
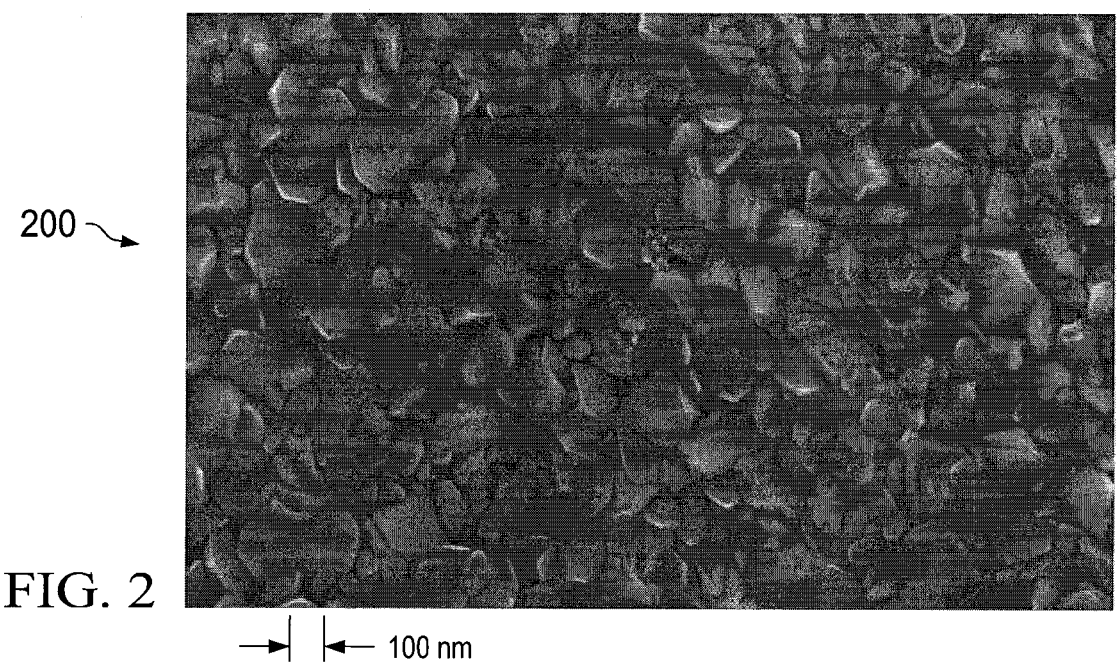
FIG. 2 depicts a view of the structures that comprise the conductive layer of the heating element of FIG. 1.

FIG. 2 depicts a view 200 of the structures that comprise the conductive layer 105. The view 200 is taken by a high resolution scanning electron micrograph and shows the nanostructures of the conductive coating of the heating element system.

Figure 3A:
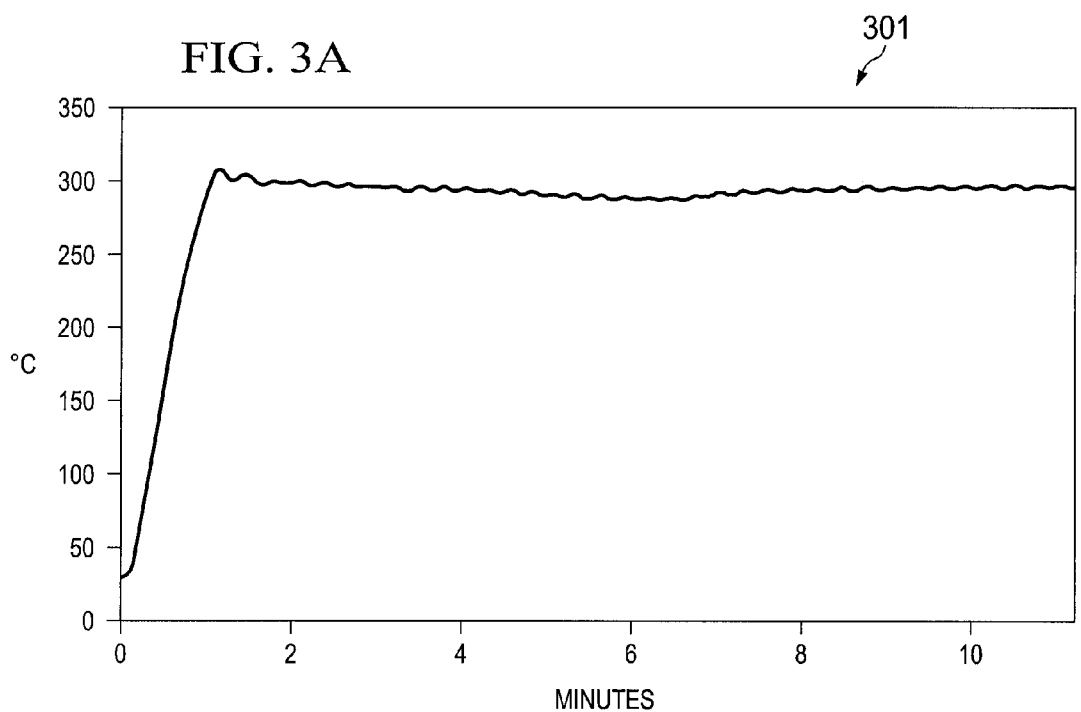
Figure 3B:
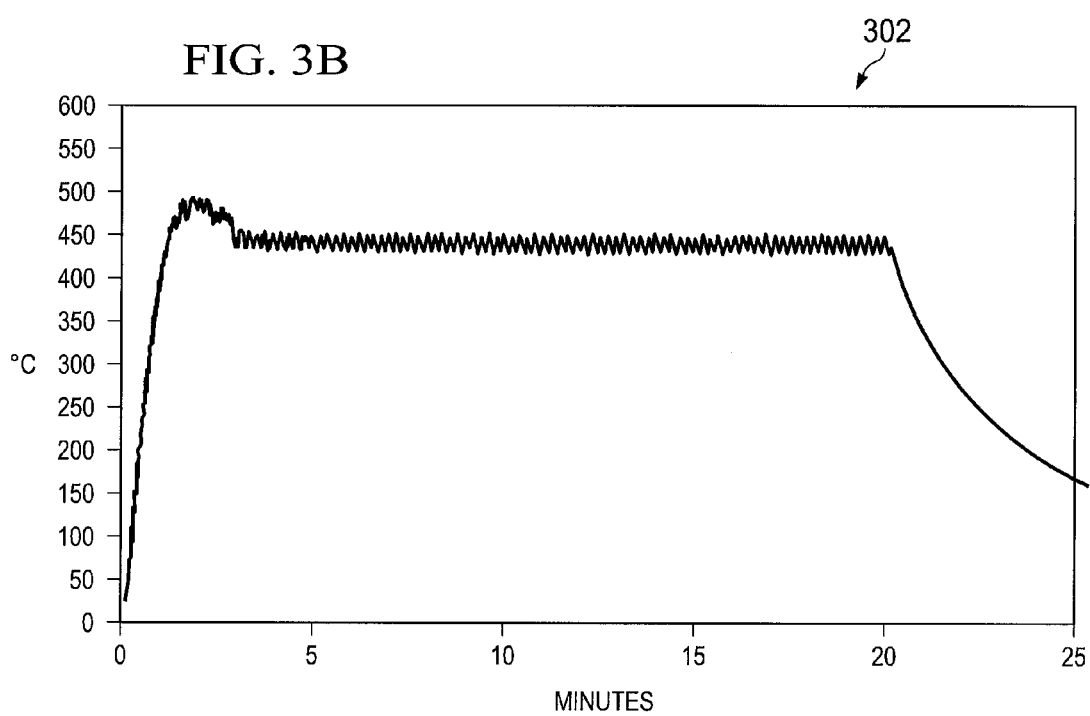

FIGS. 3A-3C depicts graphs 301, 302, 303 of performance tests for the heating element 100 of FIG. 1. FIG. 3A depicts a graph 301, which plots the temperature over time. The graph depicts rapid heating to 300° C., after which, the controller maintains the temperature around 300° C. FIG. 3B depicts a graph 302, which plots the temperature over time. The graph depicts rapid heating to 450° C., after which, the controller maintains the temperature around 450° C. After a certain period of time, the controller shuts off heating element, and the temperature begins a gradual cool down. FIG. 3C depicts a graph 302, which plots the temperature over time. The graph depicts a slow, controlled heating to 100° C., after which, the controller maintains the temperature around 100° C. Note that the initial heat up in graphs 301 and 302 is about one minute, while the initial heat up for graph 303 is about five minutes. A slow heat up is useful for lower temperature applications, as the slow heat up prevents an overshoot of the temperature, which may damage, overheat, or overcook the food. As shown in graphs 301, 302, and 303, once the desired temperature is reached, the controller cycles the heating element on/off to maintain the temperature near the desired temperature, e.g. +/−2° C.

FIG. 4 depicts an exemplary schematic diagram of a food warmer system 400, according to embodiments of the invention. The system 400 includes a food warming device 401 that holds food (not shown). The system 400 also includes interface 402 that allows a user to control one or more aspects of the food warmer. For example, turn the warmer on/off, set a desired temperature, or set a desired on/off time. The interface may be located on the food warmer or may be a remote control. The interface may comprise switches, keypads, dials, slides, or touch screens, that allow a user to control the food warmer. The user may enter desired settings or use default settings. Alternatively, the food warmer may only allow a user to turn the device on/off and the system may operate with preset settings. Alternatively, the food warmer may only allow a user to turn the device on, heat the food to a preset temperature, and then run until the power supply is exhausted. A remote interface may communicate with the food warmer via infrared, bluetooth, cellular, or radio communications.

The food warmer comprises a temperature controller 403, a power supply 404, and the heating element 405. The heating element may comprise the arrangements and materials described above. The food warmer also includes at least one temperature sensor 406 that is located adjacent to the heating element 405.

The power supply may be a rechargeable battery. The battery may comprise a lithium ion battery. A 30 gram battery may provide 50 watts of power. The heating element requires 150 watts to heat up to 100° C. in one minute, thus requiring three batteries. The heating element requires 800 watts to heat up to 300° C. in one minute, thus requiring sixteen batteries. Different numbers of batteries may be used to provide different amounts of wattage and thus different temperatures. Note that larger, but fewer, batteries may be used to provide the required power. Further, note that single use batteries may be used. Other types of power supplies, e.g. a capacitor, may also be used. Note that in some embodiments, the food warmer may weigh less than or equal to 2 kg, empty or without food.

Note that additional/larger batteries may be used to prolong operations. For example, to maintain 100 degrees C. for an extended period of time, nine batteries may be used. The power from the first three may be used to bring the food warmer to 100 degrees C. The remaining six batteries may be used to maintain the temperature for an extended period of time. The controller 403 may activate the heating element for intermittent, short periods of time to maintain the temperature. Alternatively, the controller 403 may operate the heating element at a lower current and/or voltage to provide heat sufficient to maintain the temperature. The controller 403 uses a feedback system to change the voltage and/or current to provide the heating element with power to generate consistent, uniform, and controlled heat. The controller 403, via the sensor 406 determines the temperature of the food warmer, and controls the heating element accordingly.

Figure 5A:
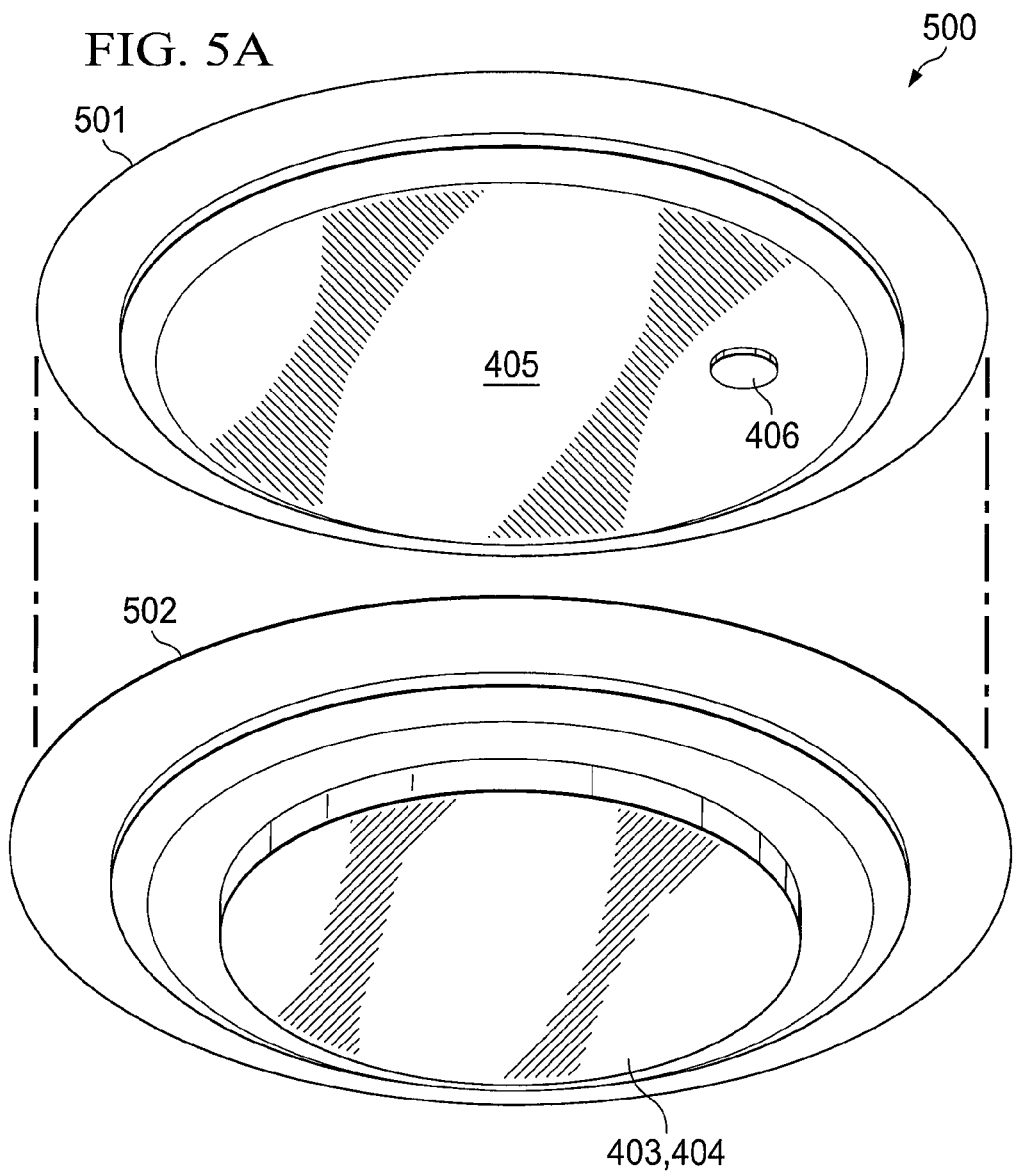
FIGS. 5A and 5B depict an exploded view and an assembled view, respectively, of a plate food warmer, according to embodiments of the invention.
Figure 5B:
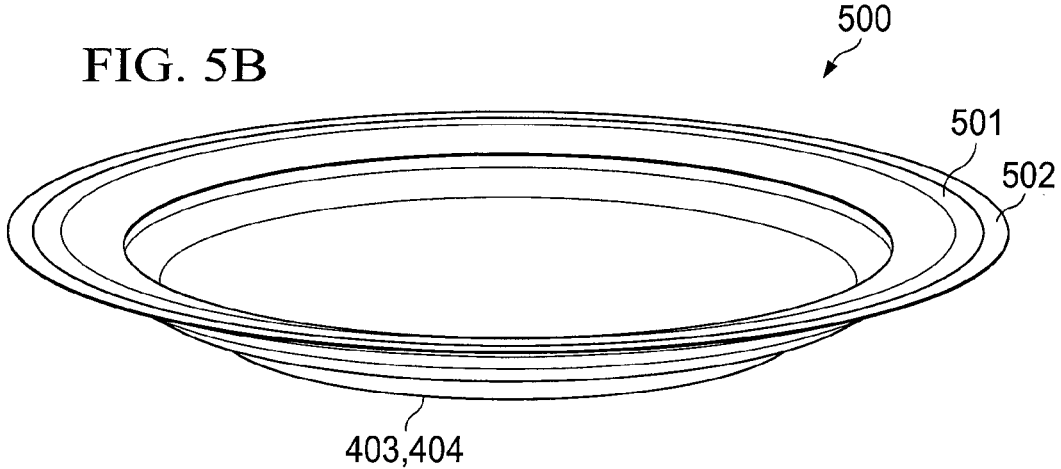

FIGS. 5A and 5B depict an exploded view and an assembled view, respectively, of a plate food warmer 500, according to embodiments of the invention. The plate food warmer 500 comprises a plate 501 and a base 502. In this arrangement, the plate 501 includes the heating element 405, and the base 502 includes the controller 403, and the power supply 404. This arrangement also includes sensor 406, which is located on the plate 501. Thus, in this arrangement, the temperature of the plate is provided to the controller 403, which would allow the plate to maintain a desired temperature for an extended period of time. The sensor may communicate with the controller 403 wirelessly or through connections, e.g. the connections between the plate and the base. Note the sensor 406 may be located on the base 502 instead. This plate is separable from the base to allow for cleaning of the plate without damaging the controller and power supply located in the base.

Figure 6A:
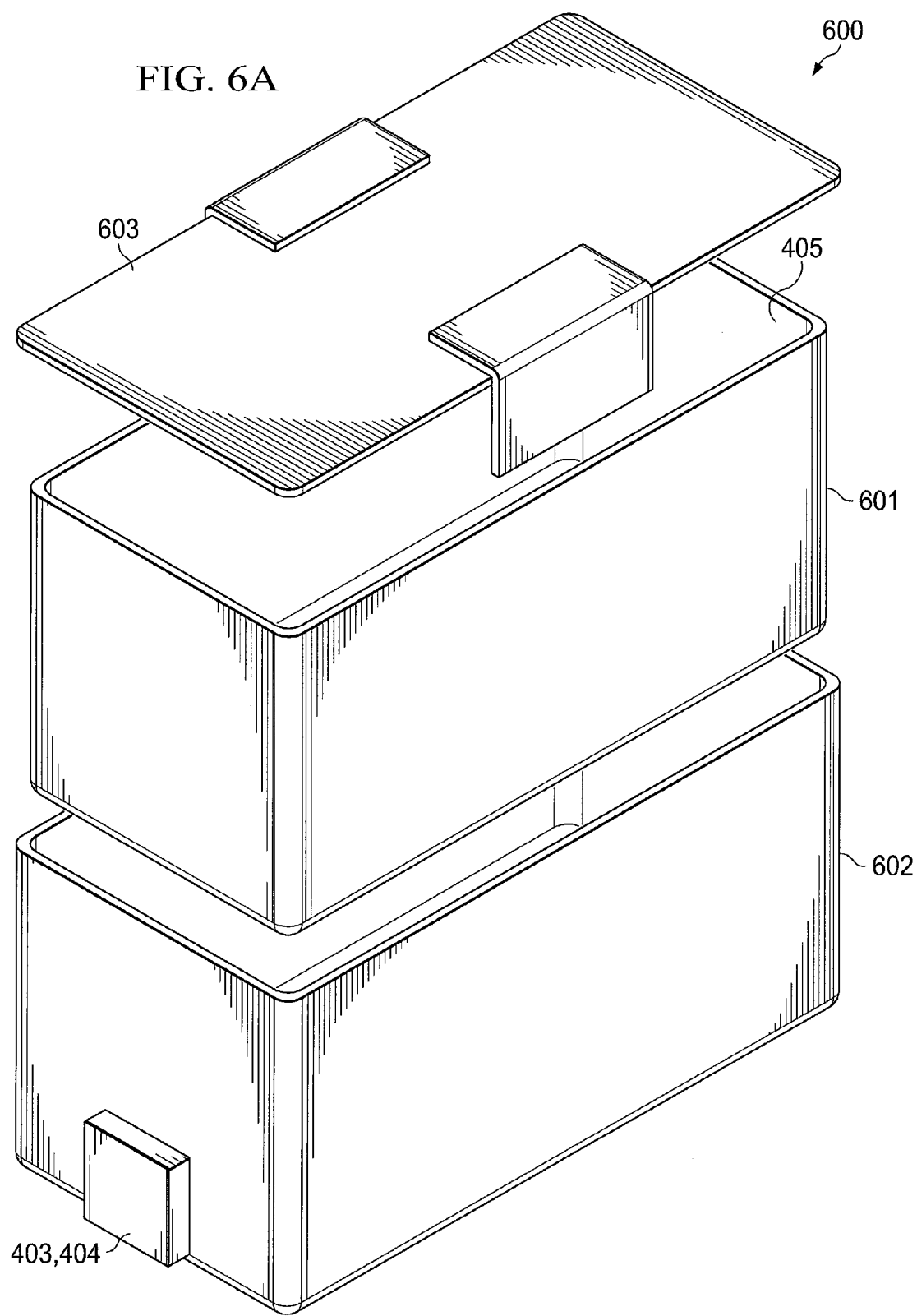

FIGS. 6A and 6B depict an exploded view and an assembled view, respectively, of a box food warmer 600, according to embodiments of the invention. The box food warmer 600 comprises an inner box 601 and an casing 602. In this arrangement, the inner box 601 includes the heating element 405. The heating element would be located on the exterior portion of the inner box, while the interior portion of the inner box would hold the food. Note that the heating element may cover the bottom portion and/or one or more of the side portions of the inner box. Further note that the heating element may comprise one single element to cover the bottom and the one or more sides or may comprise a plurality of elements, with one element for each of the bottom and the one or more sides. The casing 602 includes the controller 403, and the power supply 404.

Note that this arrangement does not include a sensor 406. Thus, in this arrangement, the food warmer merely operates for a predetermined time which would heat the inner box to a predetermined temperature, and then shut off. Note that other arrangements of the box food warmer may use a sensor 406, and operate as described above.

This inner box may be separable from the casing to allow for cleaning, or the box may be integral with the casing. This arrangement also includes cover 603 to retain heat and protect the food. The inner box may be comprised of glass, or glass with the interior portion covered with metal to assist in the transfer of heat. The casing and/or cover may comprise plastic.

The term 'cold' as used herein defines a temperature that is less than an ambient temperature. For example, one cold temperature may be 4 degrees C. as compared with an ambient room temperature of 25 degrees C. The term 'hot' as used in the claims defines a temperature that is greater than an ambient temperature. For example, one hot temperature may be 100 degrees C. as compared with an ambient room temperature of 20 degrees C.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A portable food warmer comprising: a first portion that holds food, includes a heating element deposited on a substrate; and a second portion that supports the first portion, includes a power supply and a temperature controller; the heating element is electrically connected with the power supply and the controller when the second portion supports the first portion; wherein the heating element comprises multilayered coating materials, the multilayered coating materials comprise one or more layers of insulating material, one or more layers of conducting material, and at least two electrodes; each layer of the insulating material is about 30 to about 50 nm in thickness, each layer of the conducting material is about 50 to about 70 nm in thickness; the layers are deposited using spray pyrolysis; and the conductive materials use a source metal selected from the group consisting of tin, indium, cadmium, tungsten, titanium and vanadium with organometallic precursors.

2. The portable food warmer of claim 1, wherein the spray pyrolysis is carried out at a temperature of about 650° C. to about 750° C.

3. The portable food warmer of claim 1, wherein the spray pyrolysis is carried out at a spray pressure of about 0.4 MPa to about 0.7 MPa.

4. The portable food warmer of claim 1, wherein the spray pyrolysis is carried out at a spray head speed of less than 1000 mm per second.

5. The portable food warmer of claim 1, wherein the spray pyrolysis is carried out by alternating spray passes in a direction of about 90 degrees to each other.

6. The portable food warmer of claim 1, wherein the food warmer includes an appetizer section, a main course section, and a dessert section, each section includes the heating element separately, and controlled by temperature controller in common.

7. The portable food warmer of claim 1, wherein the temperature controller includes an intelligent power monitor and control system that includes an analog-to-digital converter and pulse-width modulation drives to achieve accurate temperature control.

8. The portable food warmer of claim 1, wherein the heating element is circular in shape, with one electrode located around the outer periphery and the other electrode located at the center, forming a bull's eye pattern.

9. The portable food warmer of claim 1, wherein the insulating layer and the conducting layer comprise 8-12 layers for a total thickness of 720-840 nm for the heating element.

10. The portable food warmer of claim 1, wherein a sensor that is in contact with the heating element and provides temperature data to the temperature controller.

11. The portable food warmer of claim 10, wherein the sensor is located on the first portion and communicates with the temperature controller.

12. The portable food warmer of claim 10, wherein the sensor is located on the second portion and physically comes into contact with the heating element when the first portion is supported by the second portion.

13. The portable food warmer of claim 1, wherein the temperature controller further comprises: an interface that is operable to accept a desired temperature setting from a user; wherein the portable food warmer heats the food to the desired setting.

14. The portable food warmer of claim 1, wherein the first portion comprises a plate and the second portion comprises a plate holder.

15. The portable food warmer of claim 14, wherein the plate comprises glass with a first surface for holding the food, and a second surface upon which is formed the heating element.

16. The portable food warmer of claim 14, wherein the plate is separated from the plate holder before the plate is provided to a consumer of the food.

17. The portable food warmer of claim 14, wherein an assembly of the plate and the plate holder is provided to a consumer of the food.

18. The portable food warmer of claim 1, wherein the first portion comprises a food container having a bottom and four sides, each of which is connected to an edge of the bottom;

and the second portion comprises a box such that the food container is inserted into the box.

19. The portable food warmer of claim 18, further comprising: a cover that fits over the food container and is secured to the box.

20. The portable food warmer of claim 19, wherein at least one of the cover, food container, or the box comprises heat insulation.

21. The portable food warmer of claim 18, wherein the food container comprises glass with the bottom and four sides defining an interior region that holds the food, wherein at least one of an exterior surface of the bottom and exterior surfaces of the four sides includes the heating element.

22. A portable food warmer comprising: a first portion that holds food, includes a heating element; and a second portion that supports the first portion, includes a power supply and a temperature controller; the heating element is electrically connected with the power supply and the controller when the second portion supports the first portion; wherein the heating element comprises electrodes and multilayered coating materials, the multilayered coating materials comprise one or more layers of conducting material, each layer of the conducting material is about 50 to about 70 nm in thickness.

23. The portable food warmer of claim 22, wherein the heating element comprises one or more layers of insulating material.

24. The portable food warmer of claim 23, wherein each layer of the insulating material is about 30 to about 50 nm in thickness.

25. The portable food warmer of claim 22, wherein the heating element is deposited on a substrate, and the layers are deposited using spray pyrolysis.

26. The portable food warmer of claim 25, wherein the spray pyrolysis is carried out at a temperature of about 650° C. to about 750° C.

27. The portable food warmer of claim 25, wherein the spray pyrolysis is carried out at a spray pressure of about 0.4 MPa to about 0.7 MPa.

28. The portable food warmer of claim 25, wherein the spray pyrolysis is carried out at a spray head speed of less than 1000 mm per second.

29. The portable food warmer of claim 25, wherein the spray pyrolysis is carried out by alternating spray passes in a direction of about 90 degrees to each other.

30. The portable food warmer of claim 22, wherein the conductive materials use a source metal selected from the group consisting of tin, indium, cadmium, tungsten, titanium and vanadium with organometallic precursors.

31. The portable food warmer of claim 22, wherein a sensor that is in contact with the heating element and provides temperature data to the temperature controller.

* * * * *